(12) United States Patent
Harper

(10) Patent No.: US 6,477,981 B1
(45) Date of Patent: Nov. 12, 2002

(54) PET FEEDER INCLUDING A SAFETY RESTRICTION DEVICE

(75) Inventor: Michael D. Harper, Ft. Worth, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 09/973,307

(22) Filed: Oct. 9, 2001

(51) Int. Cl.[7] ................................................ A01K 61/02
(52) U.S. Cl. .................................. 119/52.4; 119/51.01
(58) Field of Search ........................... 119/51.01, 52.4, 119/53; D30/133, 121, 129

(56) References Cited

U.S. PATENT DOCUMENTS

| | | | |
|---|---|---|---|
| 3,720,184 A | 3/1973 | Pearce | |
| 4,573,434 A | 3/1986 | Gardner | |
| 4,721,063 A | 1/1988 | Atchley | |
| 4,947,796 A | 8/1990 | Robinette | |
| 5,109,799 A | 5/1992 | Lader | |
| D330,098 S | 10/1992 | VanSkiver | |
| D334,251 S | 3/1993 | Tiu | |
| 5,259,336 A | 11/1993 | Clark | 119/51.5 |
| D350,841 S | 9/1994 | VanSkiver | |
| D350,842 S | 9/1994 | VanSkiver | |
| D351,689 S | 10/1994 | VanSkiver | |
| 5,467,735 A * | 11/1995 | Chrisco | 119/52.4 |
| D364,942 S | 12/1995 | VanSkiver et al. | |
| D367,735 S | 3/1996 | VanSkiver et al. | |
| D374,109 S | 9/1996 | Lillelund et al. | |
| 5,794,560 A | 8/1998 | Terenzi | |
| 5,819,686 A | 10/1998 | Credeur | |
| D406,924 S | 3/1999 | Kolozsvari | |
| D406,926 S | 3/1999 | Kolozsvari | |
| 6,055,932 A | 5/2000 | Weber | |
| 6,142,099 A | 11/2000 | Lange, Jr. | 119/51.5 |
| D455,526 S * | 4/2002 | Chrisco | D30/129 |
| D458,419 S * | 6/2002 | Ross | D30/129 |

OTHER PUBLICATIONS

Ergo Systems, Inc., "Autopetfeeder, For All Size Dogs & Cats," ergosys.net.
Doskocil Manufacturing, Inc., "Product Brochure," Doskocil Manufacturing, Inc. (Arlington, TX, (Jan. 4, 1998).
Blitz USA, "Petite Gourmet, Pet Feeder Product," Blitz USA, (Miami, OK), (Sep. 2001).

* cited by examiner

Primary Examiner—Charles T. Jordan
Assistant Examiner—Judith A. Nelson
(74) Attorney, Agent, or Firm—Locke Liddell & Sapp LLP

(57) ABSTRACT

A pet feeding device including a removable storage container for storing pet food and having a safety restriction device. The container has an opening to allow pet food to empty into a support containing a bowl. As food empties, it travels through the safety restriction device or ring, which is mounted on the container opening. The safety restriction device has a bar extending from its inner boundary to prevent a small pet from inserting its head into the main storage area.

15 Claims, 3 Drawing Sheets

PET FEEDER INCLUDING A SAFETY RESTRICTION DEVICE

TECHNICAL FIELD OF THE INVENTION

The present invention relates generally to a pet feeding apparatus, and more particularly, to a continuous and gravity fed pet feeder including a safety restriction device to prevent pets from injuring or suffocating themselves when using the pet feeding apparatus.

BACKGROUND OF THE INVENTION

Although there have been numerous pet feeders designed, many have proven to be hazardous to small pets. Pet feeders typically contain large inverted storage containers that gravity feed pet food into a base portion having a food bowl. By using these devices, pet owners have the convenience of feeding their pets less frequently as the food dispensing function is performed automatically; thus, pet owners can be away from their pets for longer periods of time.

In some instances, however, food containers will separate from the base portion for various reasons, often posing a hazard to pets. If a pet owner is not present to reassemble the device, small pets will often insert their heads into the storage container to eat the food located inside. Because the opening is large enough for pets to insert their heads, some pets are seriously injured and in some instances have died from suffocation.

The present invention prevents pets from inserting their heads inside such containers while also allowing food to gravity feed into a lower bowl.

SUMMARY OF THE INVENTION

The present invention comprises a pet feeding apparatus to dispense a constant supply of pet food for pets during extended periods of time. The pet feeding apparatus comprises a storage container for storing pet food, a base structure that includes a mounting structure to support and hold the storage container and a bowl to receive pet food as it is dispensed from the storage container exit. Food is gravity fed into the bowl from the container to maintain a minimum food level in the bowl for extended periods of time.

The present invention further comprises a restriction device that attaches to the storage container opening to prevent pets from inserting their heads inside the container in the event that a pet separates the storage container from the base structure mount. The restriction device comprises at least one restriction bar extending across the inner boundary of the restriction device. The present invention reduces the risk of suffocation or serious injury to the pet by preventing the pet from inserting its head inside the container. The restriction bar contains a V-shaped cross section or any other cross section suitable to prevent food from lodging on the restriction bar as food exits the container past the bar and into the lower bowl. The restriction device can be permanently attached or molded as an integral part of the container or it can be removable.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DETAILED DESCRIPTION

Figure 1:
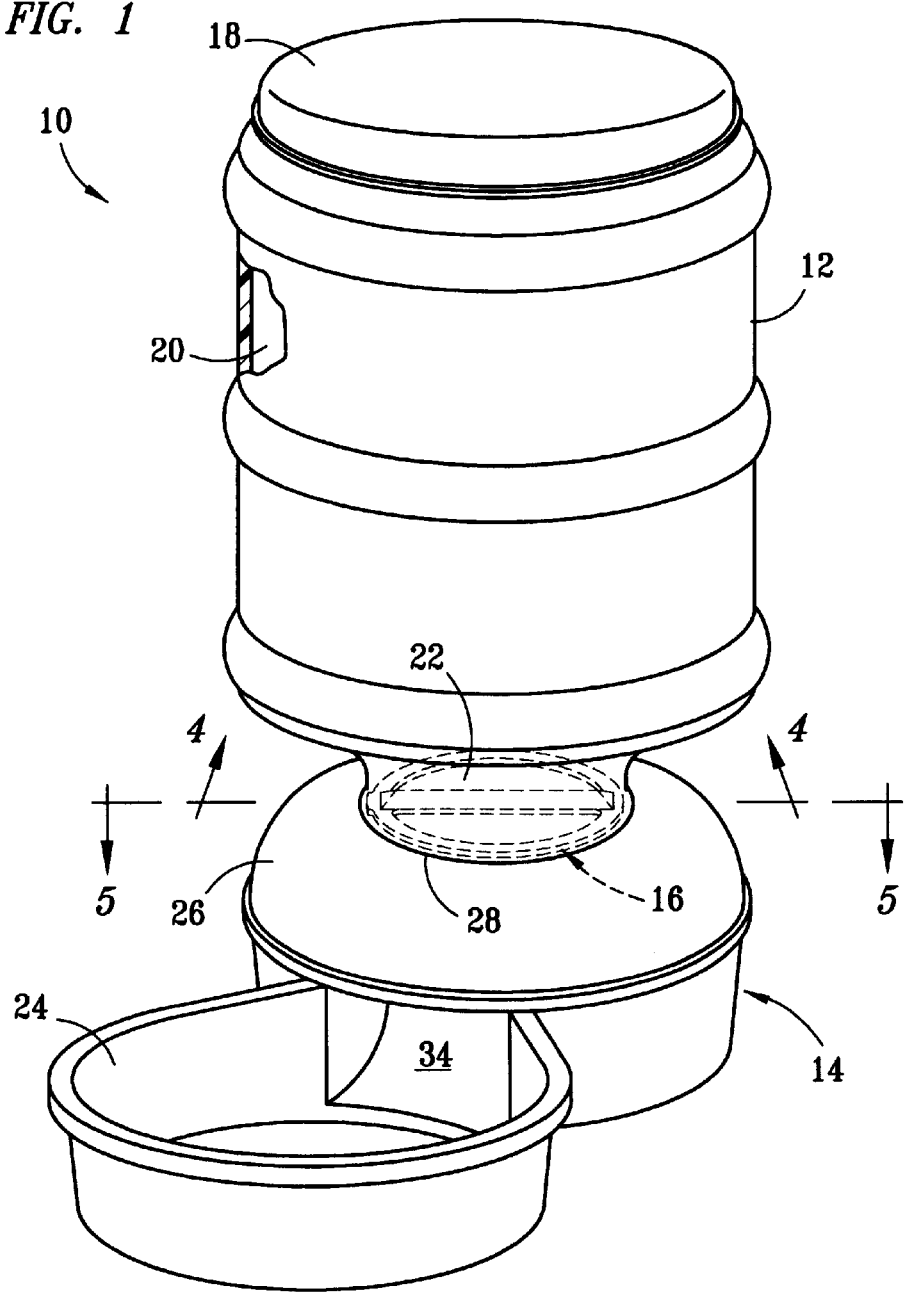
FIG. 1 is a perspective view of the pet feeding device showing the food storage container, base structure and restriction device.

Reference is now made to Drawings wherein like reference characters denote like or similar parts throughout the five figures. Referring to FIG. 1, a pet feeder generally identified by the numeral 10 includes a container 12, a base generally identified by the numeral 14 and a restriction device generally identified by the numeral 16.

Container 12 includes a lid 18, a storage area 20, and storage area opening 22. Pet food is deposited inside container 12 by removing lid 18 and filling storage area 20 with pet food. Container 12 preferably fabricated from a lightweight plastic material and is clear to enable pet owners to view the food level.

Figure 4:
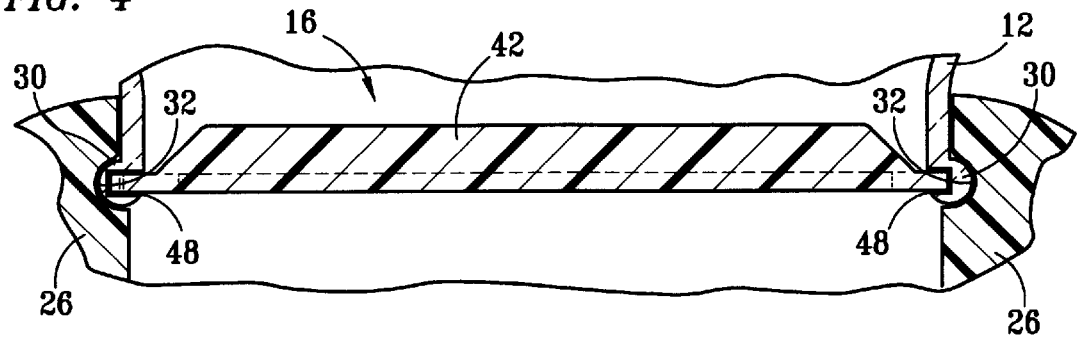
FIG. 4 is a section view taken along the line 4—4 of FIG. 1.

Base 14 includes a bowl 24 and a container support 26. Bowl 24 has an open top and is shaped to hold a supply of pet food so pets may eat therefrom. Support 26 is connected adjacent bowl 24 and supports container 12 when the container is mounted on a support opening 28. As best seen in FIG. 4, container 12 mounts onto support 26 by inserting a lip 30 extending from container 12 inside a support slot 32, which extends around storage area opening 22. This configuration permits container 12 to be easily removed from support 26 without using tools and with minimal force in order to clean or store the apparatus.

Referring again to FIG. 1, pet food gravity feeds from container 12 into bowl 24 via a ramp 34, which provides a passageway for food to travel from opening 22 to bowl 24 through support 26.

Figure 2:
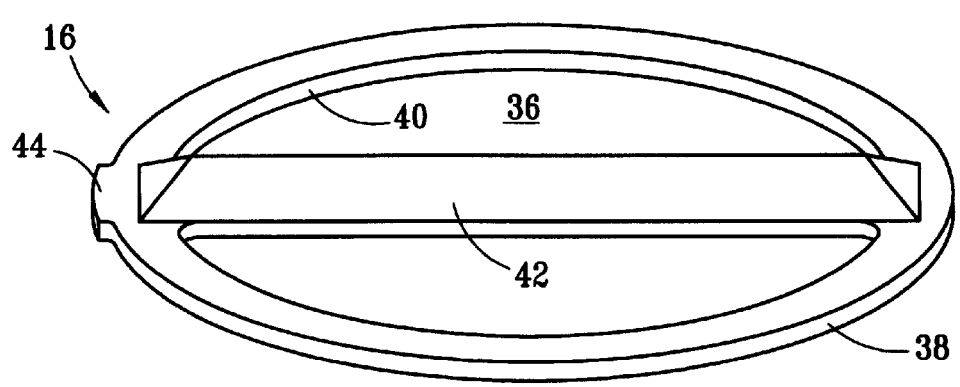
FIG. 2 is a perspective view of the safety restriction device.
Figure 3:
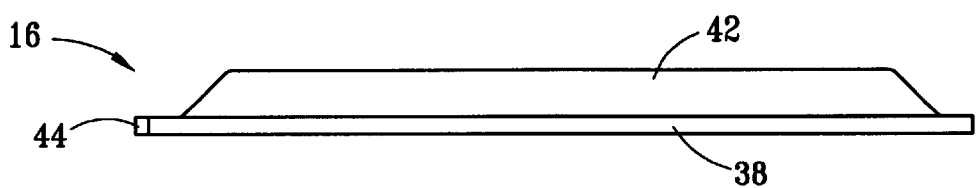
FIG. 3 is a side elevation view of the safety restriction device.
Figure 7:
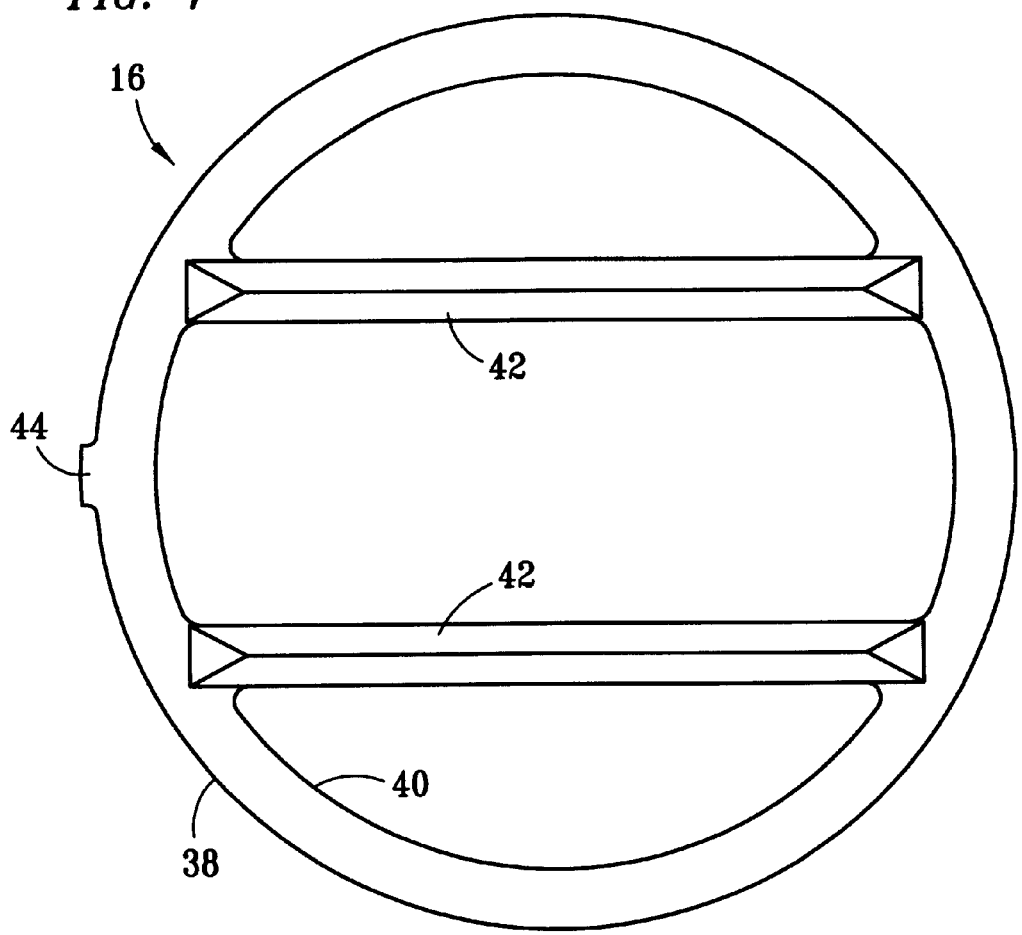
FIG. 7 is a top elevation view of the safety restriction device having multiple restriction bars.

Restriction device 16 is positioned in storage area opening 22 and is detailed in FIGS. 2 and 3. Restriction device 16 is generally shaped as a ring having an opening 36 and includes an outer boundary 38, an inner boundary 40, a restriction bar 42 and a tab 44. When placed in opening 22, restriction bar 42 prevents pets from inserting their heads inside container 12 thereby reducing the risk of suffocation or serious injury. While only one restriction bar 42 is illustrated extending into opening 36 and across the diameter of the inner boundary 40, there may be multiple restriction bars extending across the diameter (not shown) or there may be multiple restriction bars extending across a chord length (i.e., extending from any two points on the inner boundary of the restriction device) of restriction device 16 (FIG. 7). A bar for purposes of this invention is defined not only to include straight pieces that are longer than are wider, but also any shaped piece that extends from inner boundary 40 into opening 36. Examples of various configured bars may include, but are not limited to bars with multiple curves or "turns", "L" shaped bars, "C" shaped bars, etc. It should also be noted that any bar 42 configuration, or combination of bars 42 extending into and/or across opening 36 can be used as long as it prevents pets from inserting their heads inside container 12 while allowing food to empty from the container 12. Restriction bar 42 can be mounted as a cantilever so that it is supported on one end while having the other end extend while being unsupported toward the middle portion of opening 16. Furthermore, the restriction bar can extend out of the plane created by opening 16 in a direction toward container 12 or in a direction toward support 26.

Figure 6:
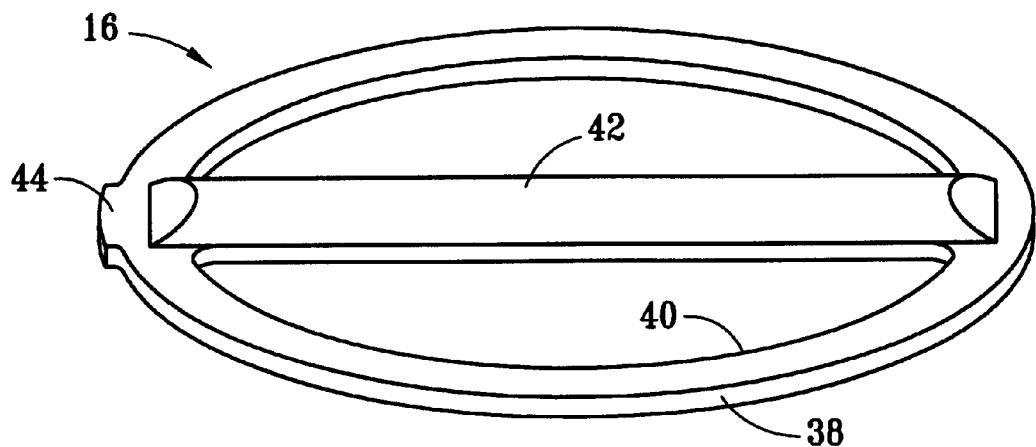
FIG. 6 is a perspective view of the safety restriction device having a semi-circular cross section.

In one embodiment, restriction bar 42 has a V-shaped cross sectional area (FIGS. 1, 2 and 3) with the point end facing toward main storage area 20 (FIG. 1). This shape prevents food from lodging along the restriction bar as food exits container 12 into support 26. Alternate embodiments of the restriction bar may include any other shaped cross section that prevents food from lodging when food flows through restriction device 16 into support 26 and onto ramp 34, such as a half circle, as seen in FIG. 6. Restriction device 16 can be fabricated with a flexible metal or plastic material having sufficient strength to prevent pets from removing the restriction device from container 12 and inserting their heads inside the container.

Figure 5:
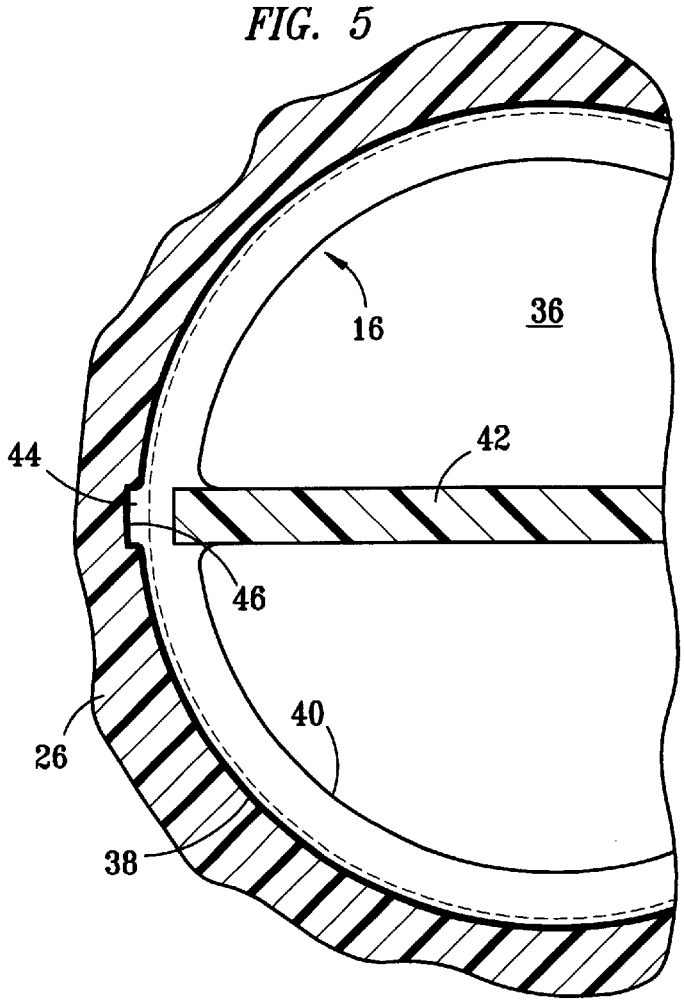
FIG. 5 is a section view taken along the line 5—5 of FIG. 1.

Installation of restriction device 16 is performed while container 12 is empty by removing lid 18 (FIG. 1) and placing the restriction device inside the container. As seen in FIGS. 4 and 5, outer boundary 38 on device 16 is appropriately shaped and sized so that it snaps inside a slot 48 within container 12 to maintain a sufficient seal to prevent restriction device 16 from disengaging with container 12. Tab 44 is positioned so that it engages with a cavity 46 (FIG. 5) to prevent device 16 from rotating while it is positioned in slot 32. Alternatively, restriction device 16 can be permanently attached by gluing or the like to storage area opening 22, or device 16 can be integrally molded as part of container 12. Inner boundary 40 is appropriately sized so that sufficient clearance is provided to permit pet food to freely flow through restriction device 16 and into support 26.

In normal use and operation of the pet feeder, lid 18 is removed from container 12 and food is placed inside storage area 20 to the desired level. The food is gravity fed into support 26 by passing through safety restriction device 16 and over restriction bar 42. Food slides down ramp 34, which is located inside support structure 26. Ramp 34 deposits the pet food into bowl 24 where the pet can eat therefrom. This configuration provides pet owners the convenience of feeding their pets less frequently as this function is performed automatically. In the event that container 12 separates from support structure 26, restriction device 16 prevents a pet from inserting its head inside the container.

Although the preferred embodiments of the present invention have been illustrated in the accompanying Drawings and described in the foregoing Detailed Description, it will be understood that the invention is not limited to the embodiments disclosed but is capable of numerous rearrangements, modifications and substitutions of parts and elements without departing from the spirit of the invention.

I claim:

1. A safety restriction device for use with a pet feeder container, the container having a main storage area with an opening to allow pet food to empty from the container, the safety restriction device comprising:
    a ring having an aperture, an inner boundary and an outer boundary, said outer boundary adapted to engage the container opening and said aperture permitting pet food to pass through; and
    a restriction bar connected to said inner boundary of said ring to prevent a small pet from inserting its head into the main storage area.

2. The safety restriction device of claim 1, wherein said restriction bar has a V-shaped cross section.

3. The safety restriction device of claim 1, wherein said restriction bar has a semi circular cross section.

4. The safety restriction device of claim 1, wherein said restriction bar extends across the diameter of said aperture.

5. The safety restriction device of claim 1, wherein said restriction bar extends as a chord length between said inner boundary.

6. The safety restriction device of claim 1, wherein said ring is fabricated from a flexible plastic.

7. The safety restriction device of claim 1, wherein said ring is fabricated from a flexible metal.

8. The safety restriction device of claim 1 wherein said storage area opening includes a slot extending around said opening and said ring is dispensed within said slot.

9. The safety restriction device of claim 8 wherein said storage area opening slot includes a cavity and said outer boundary of said ring includes a tab for engaging said cavity.

10. A pet feeder device comprising:
    a food container having a main storage area having an opening for allowing pet food to empty from said storage area wherein said opening further includes a slot extending around said opening and a cavity located therein;
    a restriction device including a ring having an aperture and an inner boundary and an outer boundary wherein said outer boundary is adapted to engage and fit inside said slot in said main storage area opening and said inner boundary is shaped to permit pet food to exit the storage container when said restriction device is engaged with said slot;
    a bar extending across said ring aperture to prevent the heads of small pets from entering into said main storage area;
    a tab located on said outer boundary of said ring to engage and lock with said cavity to prevent said restriction device from rotating while engaged with said opening; and
    a base for supporting said pet food container and including an open container for allowing pet access to food, said base including a passageway allowing food to pass from said storage area opening to said open container.

11. The storage container of claim 10, wherein said restriction device is removably mounted to said opening.

12. The storage container of claim 10, wherein said restriction bar has a V-shaped cross section.

13. The storage container of claim 10, wherein said restriction bar has a circular shaped cross section.

14. The storage container of claim 10, wherein said base includes a ramp for directing food from said main storage area to said open container.

15. A storage container for use with a pet feeder, the container comprising:
    a pet food container having a main storage area having an opening for allowing pet food to empty from said storage area; and
    a bar extending across said opening to allow pet food to be dispensed through said opening while preventing the heads of pets from entering into said storage area.

* * * * *